United States Patent
Aso et al.

(10) Patent No.: US 8,143,750 B2
(45) Date of Patent: Mar. 27, 2012

(54) LINEAR MOTOR HAVING COILS SURROUNDING AN AXIALLY MOVING MAGNETIC ROD

(75) Inventors: Toshiyuki Aso, Tokyo (JP); Shuhei Yamanaka, Tokyo (JP)

(73) Assignee: THK Co., Ltd., Tokyo (JP)

( * ) Notice: Subject to any disclaimer, the term of this patent is extended or adjusted under 35 U.S.C. 154(b) by 335 days.

(21) Appl. No.: 12/065,224

(22) PCT Filed: Aug. 22, 2006

(86) PCT No.: PCT/JP2006/316358
§ 371 (c)(1),
(2), (4) Date: Aug. 8, 2008

(87) PCT Pub. No.: WO2007/026566
PCT Pub. Date: Mar. 8, 2007

(65) Prior Publication Data
US 2009/0218894 A1    Sep. 3, 2009

(30) Foreign Application Priority Data
Aug. 31, 2005    (JP) ................................ 2005-251184

(51) Int. Cl.
*H02K 41/03*    (2006.01)

(52) U.S. Cl. ................. 310/12.31; 310/12.19
(58) Field of Classification Search ............... 310/12.31, 310/12.24–12.26
See application file for complete search history.

(56) References Cited

U.S. PATENT DOCUMENTS

| | | | |
|---|---|---|---|
| 5,434,549 A * | 7/1995 | Hirabayashi et al. | 335/229 |
| 5,801,462 A | 9/1998 | Yagoto et al. | |
| 6,040,642 A | 3/2000 | Ishiyama | |
| 6,626,658 B2 * | 9/2003 | Ito et al. | 425/170 |
| 6,977,450 B2 | 12/2005 | Asou et al. | |
| 2009/0033157 A1* | 2/2009 | Maemura et al. | 310/12 |

FOREIGN PATENT DOCUMENTS

| | | |
|---|---|---|
| CN | 1066101 A | 11/1992 |
| JP | 62-262649 A | 11/1987 |
| JP | 07336993 A * | 12/1995 |

(Continued)

OTHER PUBLICATIONS

Taketomi et al, JP 2000004575 A Machine Translation, Jan. 2000.*
English Translation of International Preliminary Report on Patentability mailed Apr. 2005 of International Application No. PCT/JP2006/316358.

(Continued)

*Primary Examiner* — Quyen Leung
*Assistant Examiner* — Eric Johnson
(74) *Attorney, Agent, or Firm* — Westerman, Hattori, Daniels & Adrian, LLP; William F. Westerman (57) ABSTRACT

A compact linear motor is provided which is able to limit a rod, which linearly moves relatively to coils, from revolving. The linear motor comprises a rod (11) equipped with magnets (13), coils (4) surrounding the rod (11), and a housing (5) covering the coils (4), and the rod (11) is made to linearly move relatively to the coils (4) by magnetic fields from the magnets (13) and current made to flow through the coils (4). And the rod (11) comprises an outer circumferential surface on which spline grooves (10*a*) are formed so as to run along an axial direction of the rod (11). The housing (5) comprises a spline nut (8) that fits the spline grooves (10*a*) and limits the rod (11) from revolving around an axis line thereof.

6 Claims, 7 Drawing Sheets

FOREIGN PATENT DOCUMENTS

| | | | |
|---|---|---|---|
| JP | 8-275497 | A | 10/1996 |
| JP | 10-313566 | A | 11/1998 |
| JP | 2000004575 | A * | 1/2000 |
| JP | 2001-286121 | A | 10/2001 |
| JP | 2002-238239 | A | 8/2002 |
| JP | 2004-248490 | A | 9/2004 |

OTHER PUBLICATIONS

International Search Report of PCT/JP2006/316358, date of mailing Nov. 21, 2006.

Chinese Office Action dated Oct. 23, 2009, issued in corresponding Chinese Patent Application No. 200680030957.4.

* cited by examiner

LINEAR MOTOR HAVING COILS SURROUNDING AN AXIALLY MOVING MAGNETIC ROD

TECHNICAL FIELD

The present invention relates to a linear motor, provided with a magnet and a coil, for obtaining a thrust force for linear movements based on a magnetic field from the magnet and current made to pass through the coil. In particular, the present invention relates to a rod-type linear motor having a rod with a magnet inserted into a plurality of laminated coils.

BACKGROUND ART

A linear motor is provided with a stator and a rotor, which are produced to be similar in principle to those of a rotary motor, but elongated linearly. Thus, in the linear motor, electric energy is converted into thrust for moving linearly. For this linear thrust, the linear motor is used as a one-axis actuator to enable a moving object to move linearly.

From a point of view of shapes, the linear motor can be classified into a rod type and a flat type. The rod-type linear motor is provided with a plurality of cylindrical coils which are laminated on one another and a rod with magnets is inserted into a bore (hollow space) formed by the laminated coils. For example, the plural coils are formed as three phases consisting of U, V and W phases. Accordingly, when three-phase currents whose phases are different from each other by 120 degrees are supplied to the coils, magnetic fields are generated to move along the axis-line direction of the coils. This moving magnetic fields give thrust to the rod, resulting in that the rod moves linearly relatively to the coil in synchronization with the speed of the moving magnetic fields. In contrast, the flat-type linear motor is provided with a plurality of plate-shaped magnets arranged on a track rail and a plurality of coils arranged to face the track rail. With regard to the linear movement of the coils relative to the magnets, this flat-type linear motor obeys the same principle as the rod-type linear motor.

As to the rod-type linear motor, the present applicant has already proposed a rod-type linear motor disclosed in the patent document 1. In this linear motor, a support bracket is secured to a base and a rod whose both ends are secured to the support bracket, and coils are able to move linearly relative to the rod. In other words, the rod side is fixed, while the coil side is subjected to the linear movement. The coils are covered by a housing, and the coils and the housing are moved linearly together using, as a guide, a linear guide located between the base and the housing.

[Patent Document 1] Japanese Patent Laid-open Publication No. 2004-248490.

DISCLOSURE OF THE INVENTION

Problems to be Solved by the Invention

When it is possible to linearly move the rod with both the coils and the housing fixed, the linear motor has a wide range of applications as an actuator. During the development step of the linear motor, the applicant tried securing the housing to the base and arranging the bush to the housing for guiding the rod to move linearly.

However, in this configuration, the rod is located to float in the coils and only the axial thrust force acts on the rod from the coils. Hence, if momentum happens to give a rotary force to the rod, the rod is forced to revolve. In some cases, a moving body is attached to the rod or a linear scale for feedback control is attached to the rod. Accordingly, if the rod revolves, there occur various problems. For example, the moving body is also forced to revolve or the linear scale cannot detect the speed and the travel distance of the rod.

In the linear motor disclosed in the foregoing patent document 1, in which the coil side moves linearly, a linear guide arranged between the housing and the base prevents the coil side from revolving. In cases where the support technique for the linear motor, which is described in the patent document 1, is applied to the linear motor with the rod side moved linearly, it is possible to reduce the revolution of the rod. In other words, both the coils and the housing are secured to the base and the linear guide is arranged between the base and the rod, the rod is preventable from revolving when the rod is made to move linearly. However, in this arrangement, the linear guide arranged between the base and the rod is obliged to make the size of the linear motor larger, thus limiting the strokes of the rod.

Therefore, an object of the present invention is to provide a linear motor which is compact in its size and capable to limit the revolution of a rod linearly moving relative to the coils.

Means for Solving the Problems

In order to solve the foregoing problem, the present disclosure provides a linear motor characterized in that the linear motor comprises a rod equipped with magnets, coils surrounding the rod, and a housing covering the coils, the rod being made to linearly move relatively to the coils by magnetic fields from the magnets and current made to flow through the coils, wherein the rod comprises an outer circumferential surface on which spline grooves are formed so as to run along an axial direction of the rod, and the housing comprises a revolution stopper that fits the spline grooves and limits the rod from revolving around an axis line thereof, which is able to solve the foregoing problem.

The disclosure is also characterized in that, in the linear motor described above, the revolution stopper comprises a spline nut having an inner circumferential surface on which a rolling-element rolling groove is formed and a rolling-element circulation passage along which rolling elements circulates, and rolling elements arranged in the rolling-element circulation passage of the spline nut and rolls and moves between the rolling-element rolling grooves and the spline grooves in response to a relative movement of the spline nut to the spline grooves.

The disclosure is further characterized in that, in the linear motor described above, the rod comprises a magnet shaft that allows the magnets to be inserted into a hollow space and that avoids the spline grooves from being formed thereon, and a spline shaft connected to an end of the magnet shaft and formed to have the spline grooves thereon.

The disclosure is still further characterized in that, in the linear motor described above, the spline shaft is connected to the magnet shaft by inserting an end of the spline shaft into an end of the pipe.

The disclosure is still further characterized in that, in the linear motor described above, the housing is equipped with the spline nut that guides the spline shaft and a bush that guides the magnet shaft, and the rod is supported at two support positions provided by the spline nut and the bush.

Effects of the Invention

According to the present invention descried in claim 1, it is possible to limit the rod, which linearly moves relative to the coils, from revolving with less costs and compact size maintained. As the spline groove is not formed on the magnet shaft, the thickness of the magnet shaft can be made smaller.

According to the present invention descried in claim 2, the rolling contact of the rolling elements is used, so that the sliding resistance of the rod which linearly moves relative to the coil can be reduced.

According to the present invention descried in claim 3, the spline grooves are not formed on the magnet shaft, with the result that the thickness of the magnet shaft can be made smaller. Hence the linear motor can be made compact. The fact that the thickness of the magnet shaft is made smaller will lead to an increase in the strength of magnetic fields from the magnets. In contrast, in cases where the spline grooves are formed on the magnet shaft, the strength of the spline grooves against quench hardening and other treatments should be taken into consideration, resulting in that it is difficult to make the thickness of the magnet shaft smaller.

According to the present invention descried in claim 4, it is possible to mutually connect the magnet shaft and the spline shaft in a state where their axis lines agree with each other.

According to the present invention descried in claim 5, both the spline nut and the bush are able to guide linear movements of the rod in a stable manner.

DESCRIPTION OF REFERENCE NUMERALS

4 . . . coil
5 . . . housing
7 . . . bush
8 . . . spline nut (turn stopper)
9 . . . magnet shaft
10a . . . spline groove
10 . . . spline shaft
11 . . . rod
13 . . . magnet
28 . . . ball (rolling element)
31 . . . return path (rolling-element circulation passage)
32 . . . direction changing passage (rolling-element circulation passage)

BEST MODE FOR CARRYING OUT THE INVENTION

Figure 1:
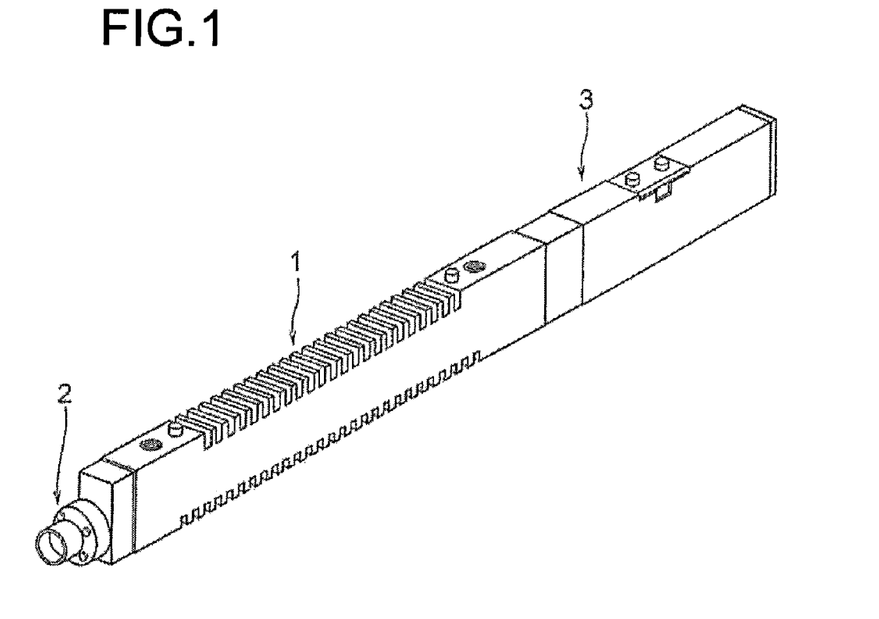
FIG. 1 is an external perspective view of a linear motor according to an embodiment of the present invention.

Referring to the accompanying drawings, an embodiment of the present invention will now be described. FIG. 1 shows the external perspective view of a linear motor according to the embodiment of the present invention. The linear motor according to the embodiment is produced as a one-shaft actuator which is used to carry a moving member such as electronic parts in a one-shaft direction. Specifically, this linear motor is used in a head shaft incorporated in a chip mount which mounts chip-like electronic parts in place. The linear motor has an elongated rectangular-solid motor body portion 1, in which a rod portion 2 is assembled to travel back and forth. The speed and travel distance of the rod portion 2 are detected by a detecting portion 3 secured to the rear end of the motor body portion 1.

Figure 2:
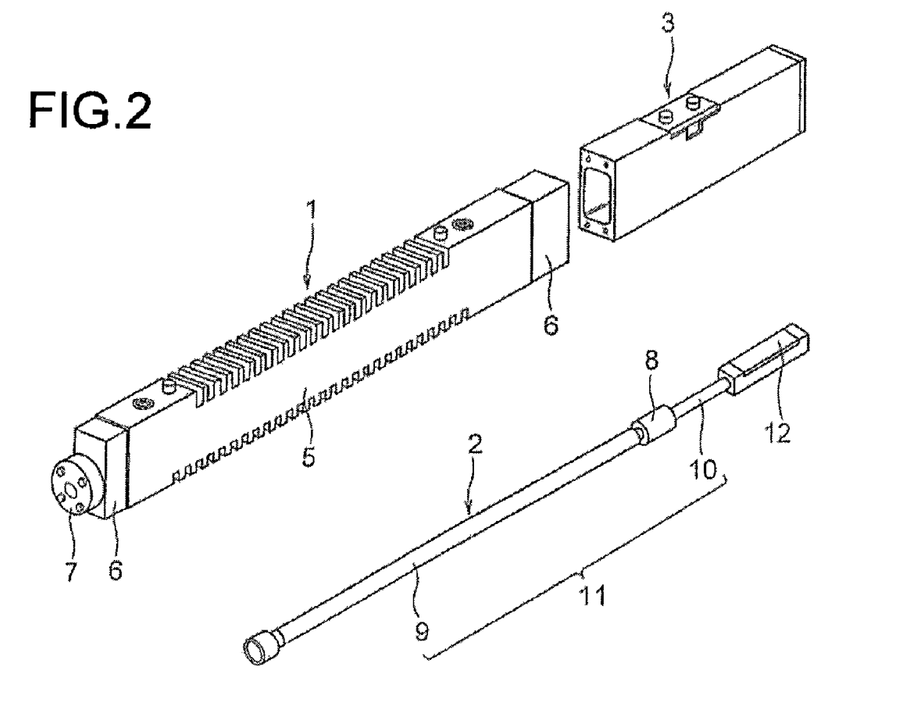
FIG. 2 is a perspective view of a disassembled state of a motor body portion, a rod portion, and a detecting portion of the linear motor.

FIG. 2 shows the linear motor disassembled into the motor body portion 1, the rod portion 2 and the detecting portion 3. These components will now be outlined first.

Figure 4:
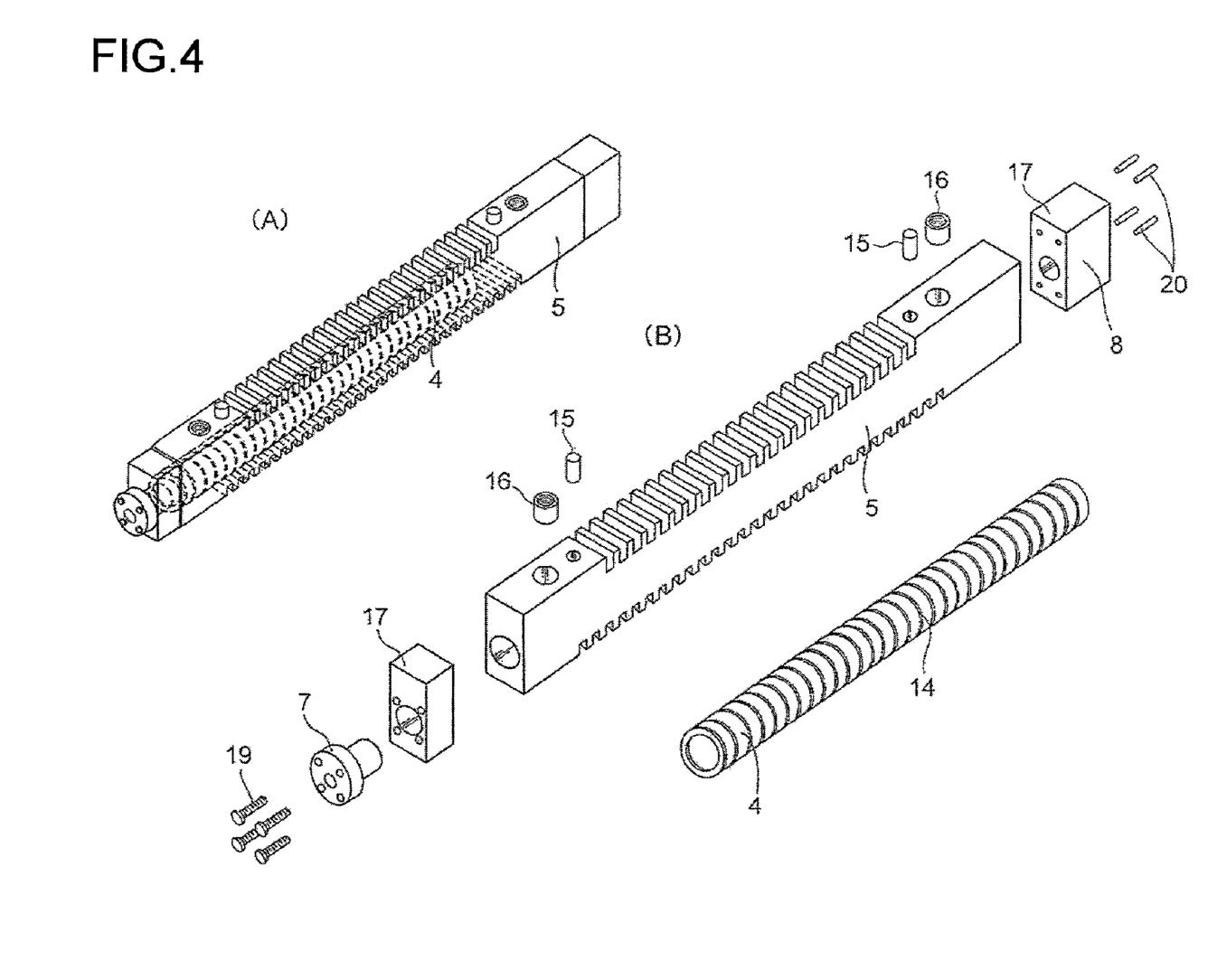
FIG. 4 is a perspective view of the motor body portion (in this figure, (A) shows the perspective view of the motor body portion and (B) shows a perspective view of a disassembled state of the components of the motor body portion)

The motor body portion 1 is provided with a housing 5 covering the plurality of coils 4 stacked on one another (refer to FIG. 4). To both ends of the housing 5, a single pair of end members 6 is secured. To one of the pair of end members 6, a bush 7 is attached which guides the rod portion 2, while to the remaining end member 6, a spline nut 8 is attached which guides the rod portion 2. Though FIG. 2 shows the state where the spline nut 8 is fit outside on the rod portion 2, the spline nut 8 is fit outside on the rod portion 2 and arranged to one of the end members 6. The rod portion 2, which is made to move linearly relative to the motor body portion 1, is supported at the two support positions provided by the bush 7 and the spline nut 8.

The rod portion 2 comprises a rod 11 connecting a magnet shaft 9 equipped with magnets and a spline shaft 10 on which a spline groove is formed, and a linear scale 12 connected to the rear end of the elongated rod 11. The linear scale 12 cooperates with the detecting portion 3 to detect speed and travel distance of the rod portion 2.

The detecting portion 3 incorporates an encoder to read out a scale of the linear scale 12. This detecting portion 3 is secured to the base of an intended part to which the motor body portion 1 of the linear motor is arranged. That is, both the motor body portion 1 and the detecting portion 3 are secured to the base. As a variation, the detecting portion 3 may be secured to the rear end of the motor body portion 1.

Figure 3:
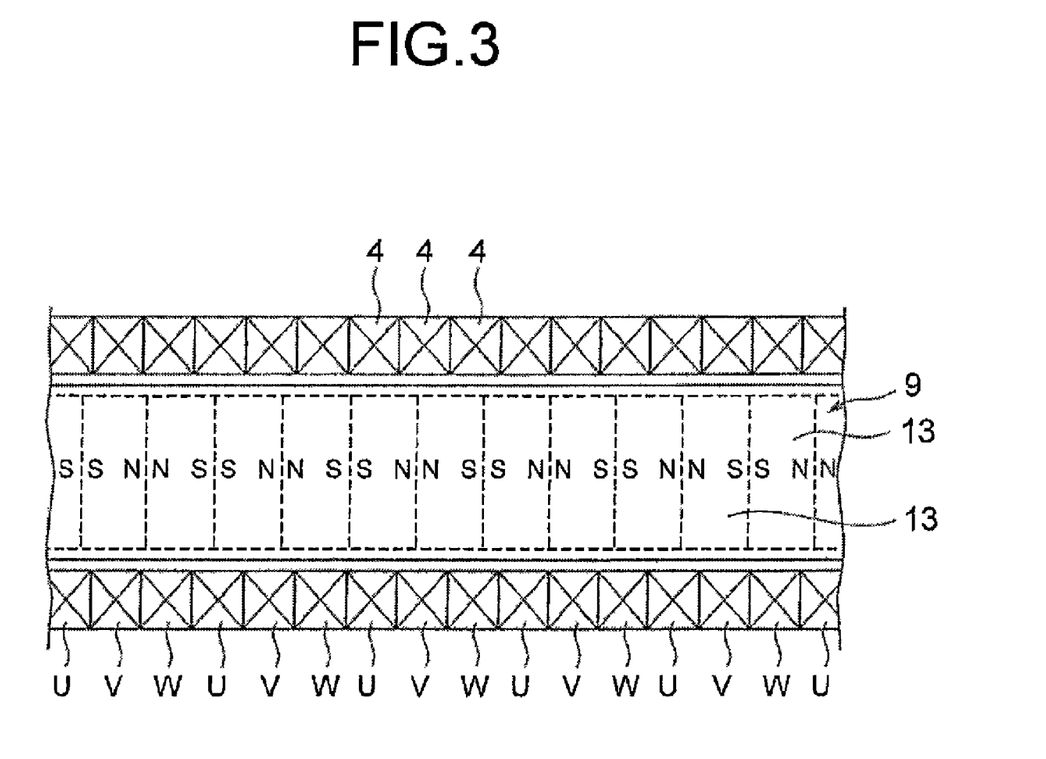
FIG. 3 is a sectional view showing a magnet and a coil of the linear motor.

The operation principle of the foregoing linear motor will now be described. FIG. 3 shows magnets and coils incorporated in the linear motor. Like the rotary type motor, the linear motor is structured to gain force for movement by magnet fields from the magnets and current flowing through the coils. Additionally, since the linear motor is intended to move linearly, the coils 4 are stacked linearly on one another so as to form a hollow space therethrough and the magnet shaft 9 is inserted through the hollow space.

Through the magnet shaft 9, the pipe-shaped hollow space is formed which accepts the insertion of the plurality of magnets 13. In the hollow space, the plural magnets 13 (segmented magentas), which are cylindrical, are stacked to enable the same polarities to be faced to each other, that is, the two N-poles are faced to each other and the two S-poles are faced to each other. Around the magnet shaft 9, the plural coils 4 are arranged to cover the magnet shaft 9. The coils 4 are composed of sets of three-phase coils, in which each set is composed of three phase coils of U, V and W phases. Combining the plurality of sets of coils 4 compose the coil unit.

When three-phase currents, the phases of which are different from each other by 120 degrees, are made to flow through the plural coils 4 divided into the U, V and W three-phase coils, moving magnetic fields is generated that move in the axis-line direction of the coils 4. The moving magnetic fields yield a thrust force, so that the magnet shaft 9 is able to linearly move relative to the coils 4 in synchronization with the speed of the moving magnetic fields.

The respective components of the linear motor, that is, the motor body portion 1, the rod portion 2, and the detecting portion 3, will now be detailed in this order with regard to their configurations.

FIG. 4 shows the motor body portion 1. This motor body portion 1 is a part in which the plurality of coils 4 is accommodated. The coils 4 are members formed by winding copper wires in a helical form. In the present embodiment, to limit the sizes of the housing 5, the coils 4 are set in an injection molding type die, and insert molding is performed by molten resin or special ceramics, resulting in that the housing 5 is produced. After the molding, when the molded items are picked up from the die, the coils 4 are already surrounded by the housing 5. This insert molding provides the advantage that the housing 5 can be made thinner. For example, in cases where linear motors are used in a parallel arrangement, the lateral width of each linear motor should be smaller. Alternatively, without using the insert molding, the coils 4 may be secured to the housing 5 by accommodating the coils 4 into the housing 5, which is made of aluminum for instance, and filling adhesive into the gaps between coils.

The housing 5 may be secured to a part which uses the linear motor as a one-shaft actuator. Thus a material of high mechanical rigidity is used for the housing. Additionally, the housing should be electrically insulated from the coils, so that a material of higher insulation is used for the housing. Moreover, to enhance the heat dissipation of the coils, a plurality of fins is formed on the housing.

In the upper face of the housing 5, positioning pins 15 and nuts 16 are embedded for attaching the linear motor to the base of the intended part. End members 17 are secured to both ends of the housing 5. The end members 17 may be insert-molded together with the housing 5 or connected to the housing 5 by the use of connecting means such as screws. Of these paired end members 17, one member is subjected to attachment of the bush 7 to guide the magnet shaft 9 of the rod 11, while the remaining member is subjected to attachment of the spline nut 8 to guide the spline shaft 10 of the rod 11. The bush 7 and the spline nut 8 are secured to the end members 17, respectively, with use of connecting means such as screws 19. Positioning pins 20 are inserted into the one of the end members 17 so as to position the detecting portion 3.

As shown in FIG. 4(A), the coil unit (the plural coils 4) is arranged within only a region of the housing in which the magnet shaft 9 of the rod 11 is made to travel, not arranged in another range of the housing in which the spline shaft 10 is made to travel. This arrangement is due to the fact that the spline shaft 10 cannot generate a thrust force even if there are coils 4, because the spline shaft 10 has no magnet.

Figure 5:
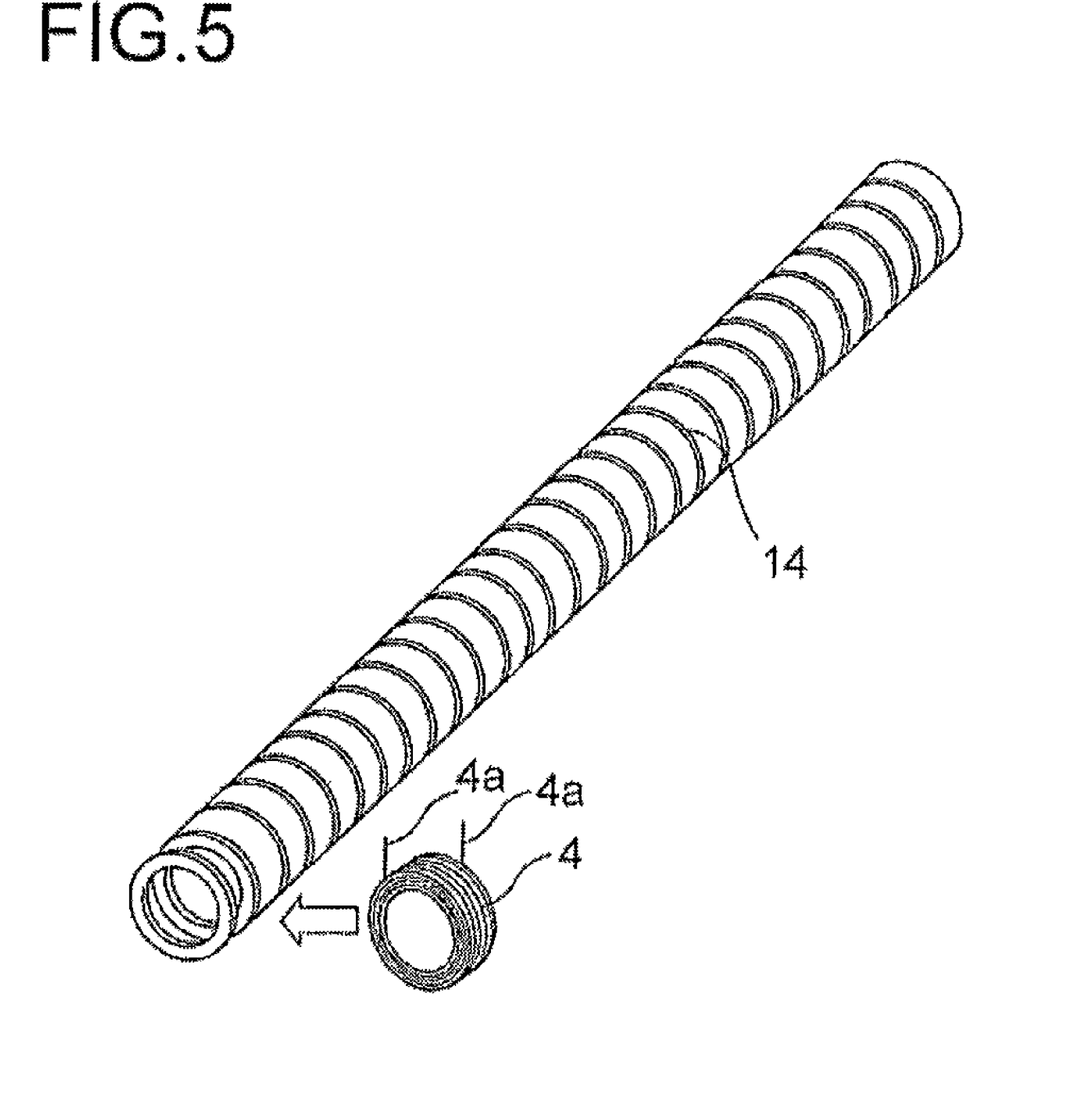
FIG. 5 is a perspective view showing a coil unit.

FIG. 5 shows the coil unit. This coil unit is a member composed of a plurality of coils 4, for example, several dozen coils, which are stacked on one another and each of which is produced by winding a copper wire in a helical form. Each coil 4 has lead wires 4a and the lead wires 4a of the coils 4 are connected every two coils between U-phase coils, between V-phase coils, and between W-phase coils. Each coil 4 should be electrically insulated from the other coils 4, and a resin-made spacer 14 is placed as an insulator between adjacent coils 4. Each spacer 14 is formed into a circular shape which is the same as the frontal-view shape of each coil 4.

Figure 6:
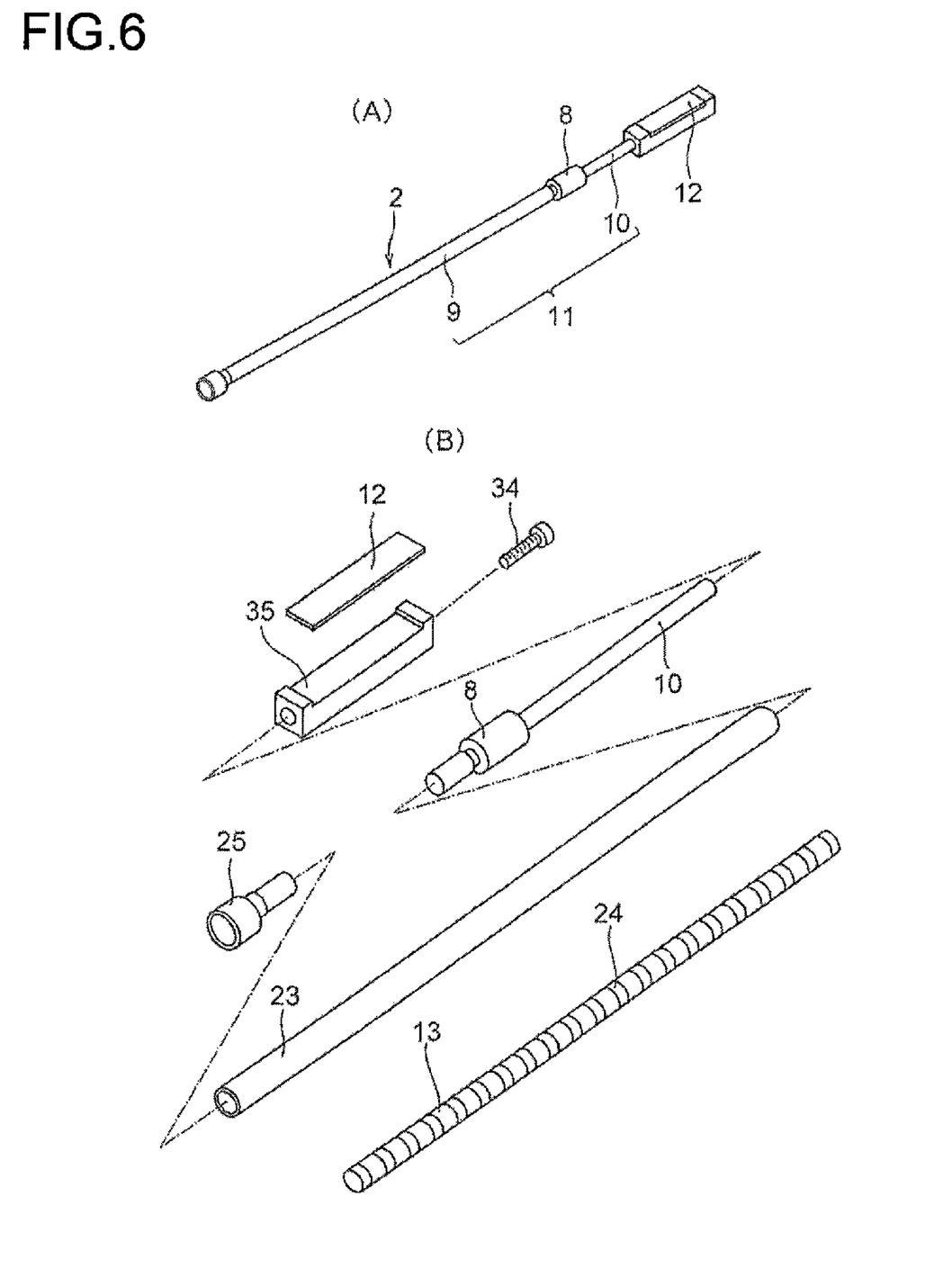
FIG. 6 is a perspective view of the rod portion (in this figure, (A) shows the perspective view of the rod portion and (B) shows a perspective view of a disassembled state of the components of the rod portion)

FIG. 6 shows the rod portion 2. This rod portion 2 has the rod 11 consisting of the magnet shaft 9 and the spline shaft 10 and the linear scale 12 attached to the rear end of the rod 11. The magnet shaft 9 is produced as a hollow member made of nonmagnetic materials including a stainless material, and has a pipe member 23 in which the magnets 13 are accommodated. In the hollow space of the pipe member 23, the plurality of cylindrical magnets 13 (segmented magentas) are stacked in such a manner that the magnets having the same polarity are faced to each other, as explained above. Between magnets 13, a pole shoe (magnetic block) 24 which is for example made of magnetic material such as iron is present as a yoke. To the distal end of the magnetic shaft 9, a magnet holder 25 is secured with the help of an adhesive or others for fixing the magnets 13 in the pipe member 23.

Figure 7:
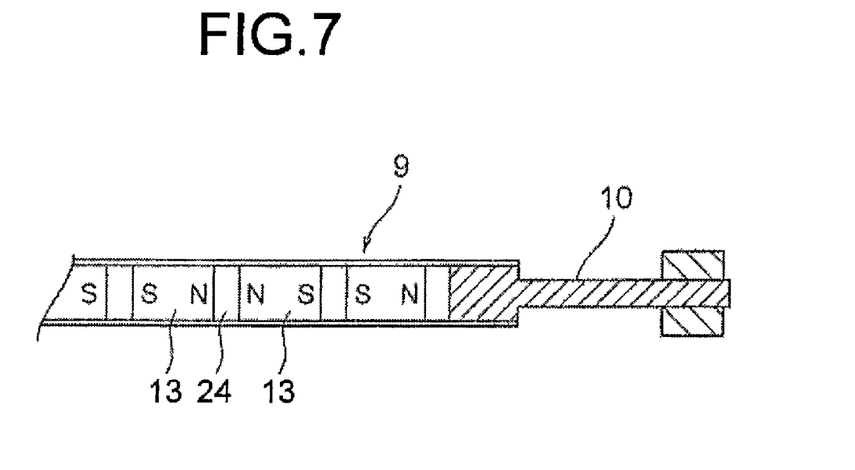
FIG. 7 is a sectional view showing a connection between a magnet shaft and a spline shaft.

A spline shaft 10 is secured to the rear end of the magnet shaft 9. As shown in FIG. 7, the spline shaft 10 has an end inserted into the hollow space of the magnet shaft 9, so that the spline shaft 10 is coupled with the magnet shaft 9 so as to make their axis lines agree with each other. This end of the spline shaft 10 also acts to hold the magnets 13 accommodated in the magnet shaft 9. As shown in FIG. 6, the spline nut 8 is fit on the outer circumferential surface of the spline shaft 10. Both the spline shaft 10 and the spline nut 8 limit the rod 11 from revolving on its axis line.

Figure 8:
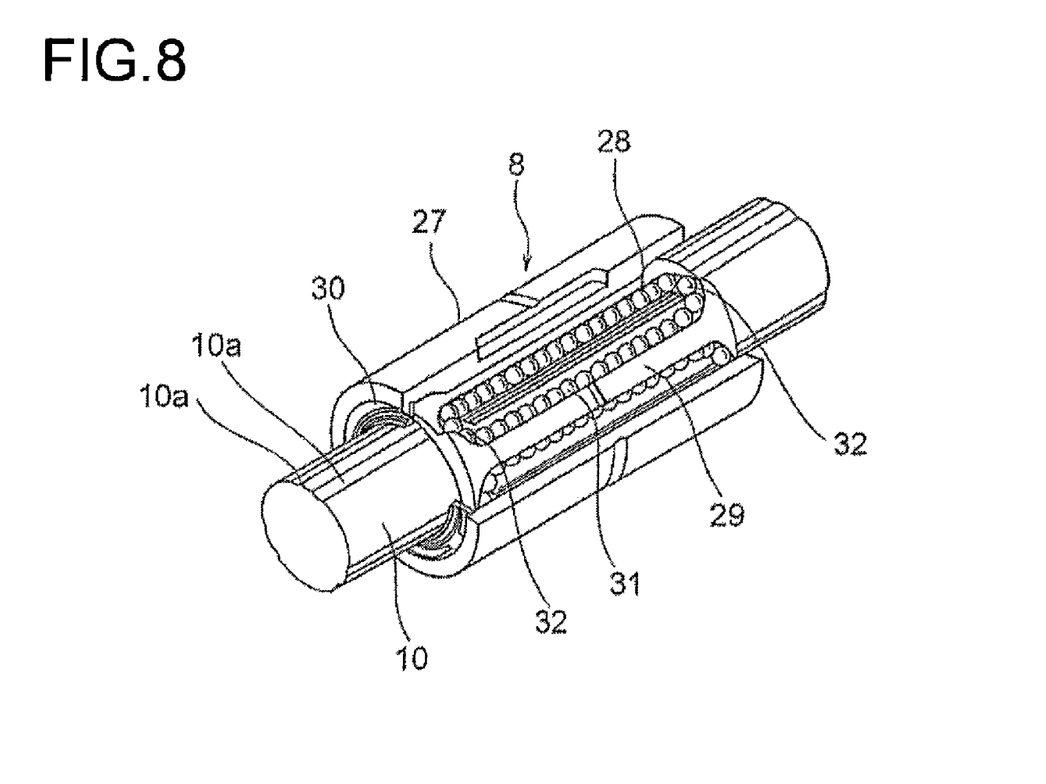
FIG. 8 is a perspective view showing the spline shaft and a spline nut.

FIG. 8 shows a perspective view of the spline shaft 10 and the spline nut 8. On the outer circumferential surface of the spline shaft 10, there are formed a plurality of spline grooves 10a running in its axis-line direction. The spline shaft 10 is made of a material, such as stainless steel, which is nonmagnetic and high in its rigidity. Since the spline grooves 10a should be subjected to rolling of balls serving as rolling elements, quench hardening is applied to the spline grooves 10a during manufacturing.

The spline nut 8 has an outer cylinder 27 which is loose-fit to the spline shaft 10, a plurality of balls 28 which are present rollably between the spline shaft 10 and the outer cylinder 27, and a retainer 29 which is incorporated in the outer cylinder 27 and formed to provide a circuit-like ball circulation passage (rolling-element circulation passage) along which the plural balls 28 are aligned. The outer cylinder 27 has an inner circumferential surface on which there are a plurality of ball rolling grooves (rolling-element rolling grooves) formed to extend in its axis-line direction so as to face the spline grooves 10a of the spline shaft 10. At each of both axis-line directional ends of the outer cylinder 27, a stopper ring 30 is arranged for incorporating the retainer 29 into the outer cylinder 27.

While the spline shaft 10 moves linearly relative to the spline nut 8, the balls 28 roll and move along a passage between the spline grooves 10a of the spline shaft 10 and the ball rolling grooves of the outer cylinder 27. Each ball which has rolled and arrived at an end of the ball rolling groove of the outer cylinder 27 is then scooped up from the spline groove 10a by the retainer 29, and the scooped ball is made to pass a U-shaped direction changing passage 32 to turn the rolling directions and enter each return path 31 extending in parallel with the ball rolling groove. Having passed through the return path 31, the ball is made to travel the direction changing passage 32 arranged at the opposite end, and then made to return to each spline groove 10a again. In this case, the return path 31 is formed to be located between the retainer 29 and the outer cylinder 27, the balls 28 in the return path 31 are prevented from contacting the spline grooves 10a.

Since the balls 28 are present between the ball rolling grooves formed on the spline nut 8 and the spline grooves 10a on the spline shaft 10, it is possible for the spline nut 8 to limit the spline shaft 10 from revolving on its axis line. Thus both the spline nut 8 and the balls 28 establish a revolution stopper.

As shown in FIG. 6, a bracket 35 is secured to the rear end of the spline shaft 10 by the use of securing means such as a screw 34. To this bracket 35, the linear scale 12 is secured with the help of adhesion. This linear scale 12 cooperates with an encoder of the detecting portion, so that the linear scale and the encoder serve as a linear encoder. On the linear scale 12, fine scales are placed at intervals.

Figure 9:
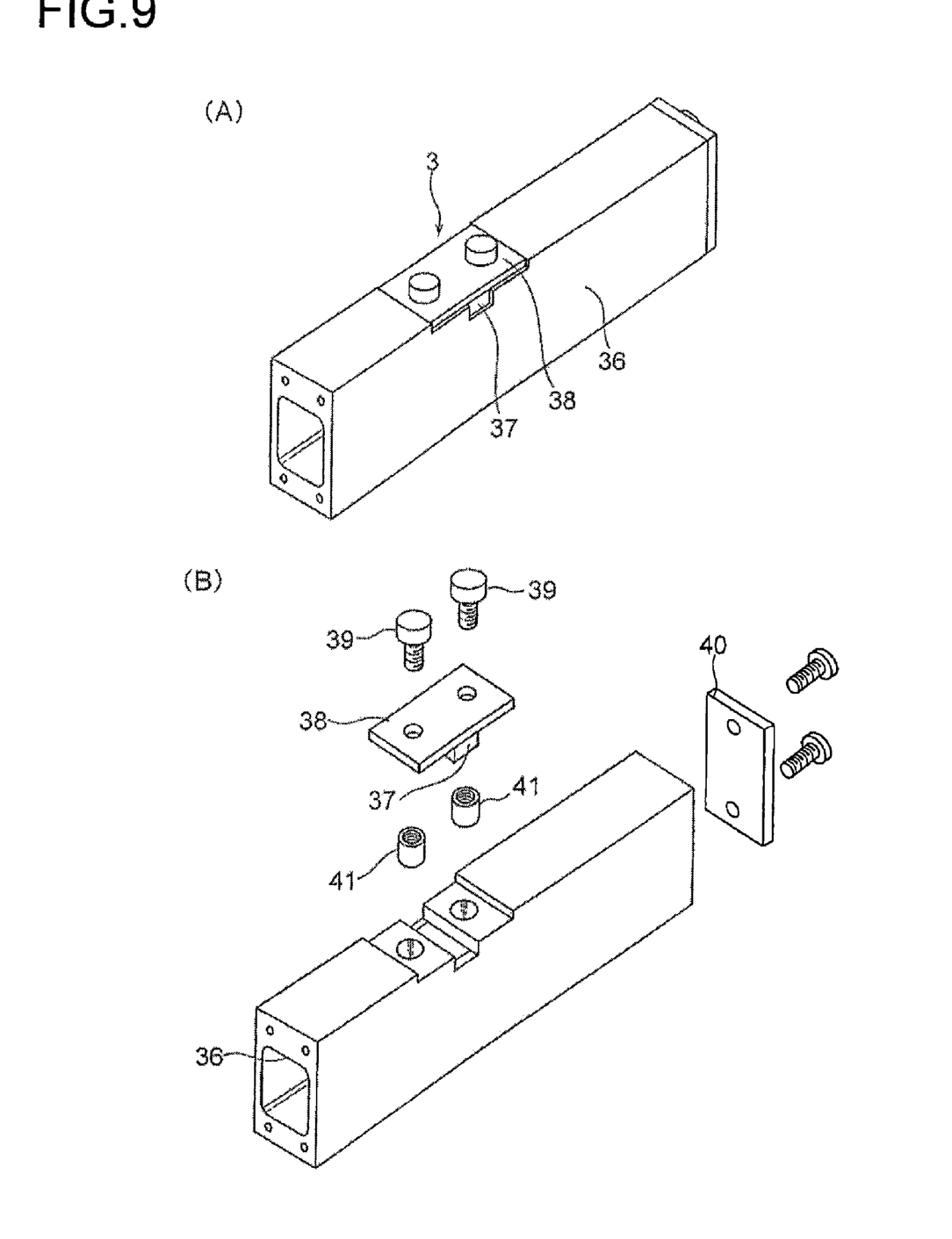
FIG. 9 is a perspective view showing the detecting portion (in this figure, (A) shows the perspective view of the detecting portion and (B) shows a perspective view of a disassembled state of the components of the detecting portion).

FIG. 9 shows the detecting portion 3. This detecting portion 3 has a bracket 36 arranged to the rear end of the housing 5 with the end member 6 therebetween and an encoder 37 fixed to the bracket 36. The bracket 36 has a hollow space formed therein and the linear scale 12 is introduced into this hollow space. In the upper-surface plate of the bracket 36, there is formed a window through which the internal space of the bracket 36 can be visually seen. An encoder substrate 38 is fixed to this window using screws 39 or other fixing means. In the upper-surface plate of the bracket 36, nuts 41 are embedded which screw together the screws 39. On the lower surface of the encoder substrate 38, there is provided an encoder 37 to read the scales of the linear scale 12. This encoder 37 has a light-emitting diode serving as a light source and a photo diode for reading the scales on the linear scale 12. Using pulsed signals produced by the encoder 37 based on its reading-in actions, the travel distance of the rod 11 is detected and the detected distance is used to perform feedback control and other applications. The end of the bracket 36 is closed by a cover 40.

Incidentally, the present invention will not be limited to the structure of the above embodiment, but can be modified into a variety of other structures without departing from the scope of the present invention. In place of placing the balls rollably and in contact between the spline nut and the spline grooves, protrusions fit to and in sliding-contact with the spline grooves may be provided on the spline nut so that the protrusions operate to stop the revolution of the rod. Further, the linear motor according to the present invention is not limited to the use as the one-axis actuator, but may be used as a multiple-axis actuator in which several linear motors according to the present invention are combined with each other.

The present specification is based on Japanese Patent Application No. 2005-251184 filed on Aug. 31, 2005, the entire contents of which are expressly incorporated by reference herein.

The invention claimed is:

1. A linear motor comprising a rod equipped with magnets, coils surrounding the rod, and a housing covering the coils, the rod being made to linearly move relative to the coils by magnetic fields from the magnets and current made to flow through the coils,
    wherein the rod has an outer circumferential surface on which a spline groove is formed so as to run along an axial direction of the rod,
    the housing has a revolution stopper that fits to the spline groove and limits the rod from revolving around an axis line thereof,
    the rod has a magnet shaft, on which the spline groove is not formed, the magnet shaft having a hollow space therein, in which the magnets are disposed, and the rod also including a spline shaft, connected to an end of the magnet shaft, and having the spline groove formed thereon,
    wherein the revolution stopper includes a spline nut that guides the spline shaft and the housing includes a bush that surrounds, directly supports the hollow space of the magnet shaft and guides the magnet shaft, and
    wherein the rod is supported at two support positions provided by the spline nut and the bush.

2. The linear motor of claim 1, wherein the revolution stopper comprises
    a spline nut having an inner circumferential surface on which a rolling-element rolling groove is formed, and a rolling-element circulation passage, and
    rolling elements, arranged in the rolling-element circulation passage of the spline nut, rolling and moving between the rolling-element rolling groove and the spline groove in response to a relative movement of the spline nut to the spline groove.

3. The linear motor of claim 1, wherein the spline shaft is connected to the magnet shaft by inserting an end of the spline shaft into an end of the hollow space of the magnet shaft.

4. The linear motor of claim 1, wherein a linear scale is secured to the spline shaft, the linear scale serving as a linear encoder in cooperation with an encoder of a detecting portion for detecting a travel distance of the rod.

5. The linear motor of claim 2, wherein a linear scale is secured to the spline shaft, the linear scale serving as a linear encoder in cooperation with an encoder of a detecting portion for detecting a travel distance of the rod.

6. The linear motor of claim 3, wherein a linear scale is secured to the spline shaft, the linear scale serving as a linear encoder in cooperation with an encoder of a detecting portion for detecting a travel distance of the rod.

* * * * *